April 12, 1960  W. P. WINTERS  2,932,336
CAN BODY HOOK FORMING MECHANISM
Filed Aug. 23, 1955  5 Sheets-Sheet 1

INVENTOR.
WILLIAM P. WINTERS
BY Charles H. Erne
Leland P. McCann
George W. Reiber
ATTORNEYS

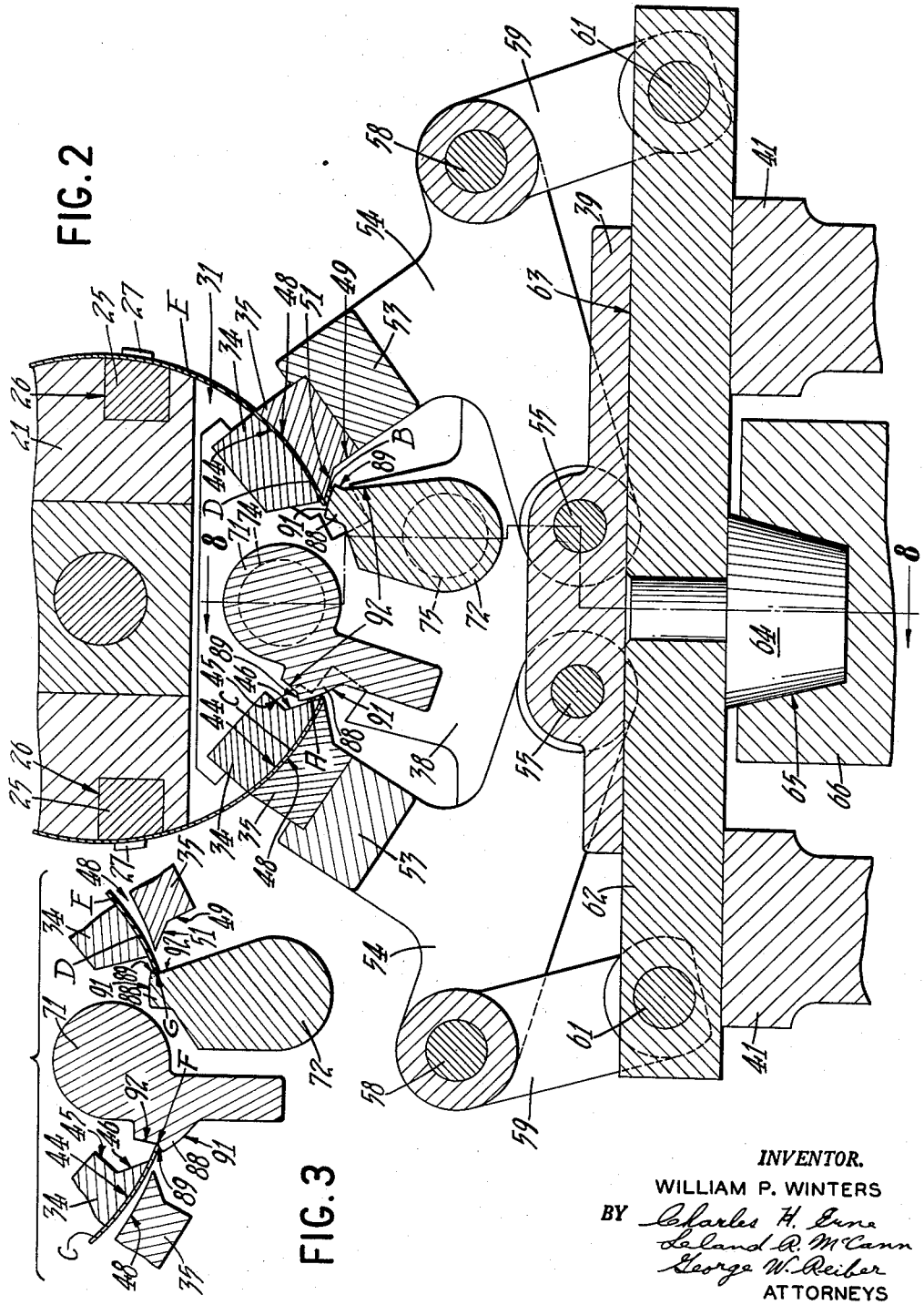

April 12, 1960 W. P. WINTERS 2,932,336
CAN BODY HOOK FORMING MECHANISM
Filed Aug. 23, 1955 5 Sheets-Sheet 3
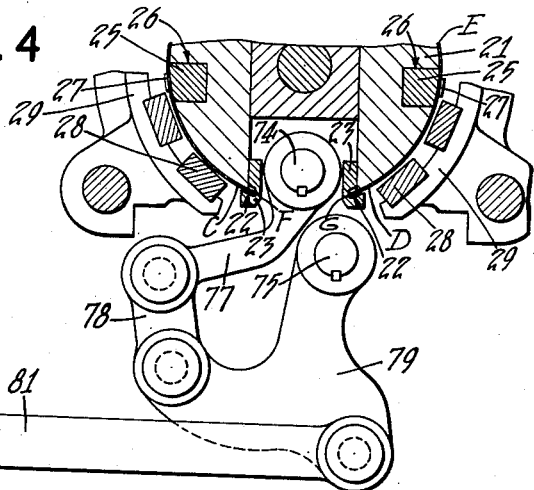
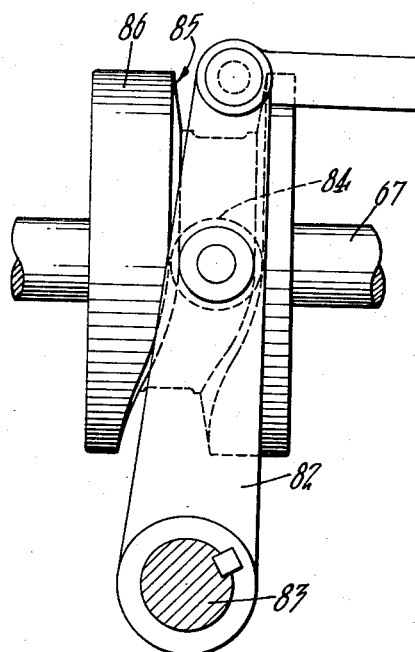
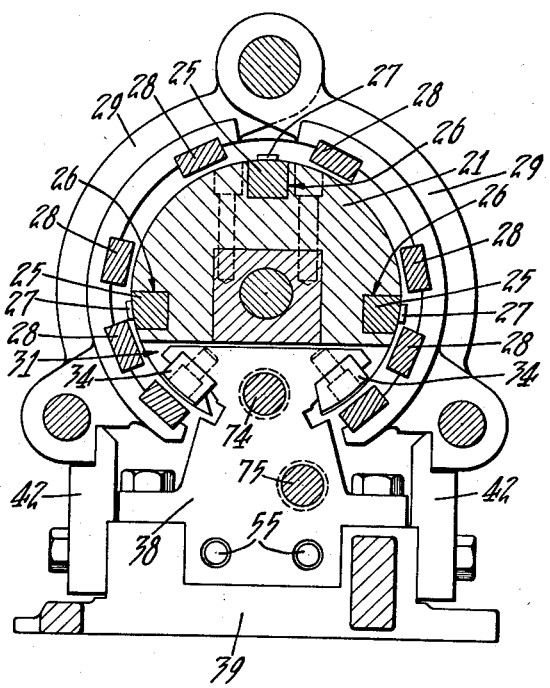
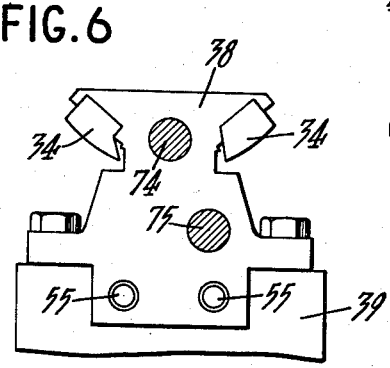
INVENTOR.
WILLIAM P. WINTERS
BY
ATTORNEYS

INVENTOR.
WILLIAM P. WINTERS
BY
ATTORNEYS

April 12, 1960

W. P. WINTERS 2,932,336

CAN BODY HOOK FORMING MECHANISM

Filed Aug. 23, 1955

INVENTOR.
WILLIAM P. WINTERS
BY Charles H. Line
Leland R. McCann
George W. Reiber
ATTORNEYS

United States Patent Office 2,932,336
Patented Apr. 12, 1960

2,932,336

CAN BODY HOOK FORMING MECHANISM

William P. Winters, Cincinnati, Ohio, assignor to American Can Company, New York, N.Y., a corporation of New Jersey Application August 23, 1955, Serial No. 530,175

2 Claims. (Cl. 153—17)

The present invention relates to machines for making sheet metal can or container bodies having side seams produced by the interfolding of reversely bent hook edges and has particular reference to an improved mechanism, for forming the hooks on the bodies prior to their embodiment in the side seams.

In the high speed operation of can body making machines, i.e. in the manufacture of bodies at rates of approximately five hundred per minute, considerable difficulty is encountered in producing complementary side seam hooks of uniform length, accurate angle relation, and square body relation. When the hooks are inaccurately made as to length, angle and squareness, they do not accurately combine when they are interengaged and pressed together to produce a side seam, with the result that the seams sometimes leak.

An object of the instant invention is to overcome this difficulty by the provision of an improved hook forming mechanism wherein a longer time period is provided for the formation of the hook so that forming of the hook is effected at a slower and more accurate rate to produce hooks of uniform length and proper angle, without affecting the overall high speed operation of the body making machine.

Another object is the provision of such a mechanism wherein the marginal edges of the body blanks are accurately located prior to formation of the hooks so as to insure proper hook lengths.

Another object is the provision of such a mechanism wherein the entire hook on each edge of the body is formed in a single pass with oscillatable tools which operate with a smooth uniform motion and thereby eliminate severe motions, thus facilitating long life and minimum maintenance.

Another object is the provision of such a mechanism which produces hooks which are square with the body, thus resulting in the manufacture of better bodies.

Another object is the provision of such a mechanism which is a compact unit which is useable without change parts for can bodies having a wide range of diameters.

Numerous other objects and advantages of the invention will be apparent as it is better understood from the following description, which, taken in connection with the accompanying drawings, discloses a preferred embodiment thereof.

Referring to the drawings:

Fig. 2 is a sectional view taken substantially along the line 2—2 in Fig. 1, with parts broken away;

Fig. 3 is a fragmentary sectional view showing certain of the parts in Fig. 2 in a different position;

Figs. 4 and 5 are reduced scale sectional views taken substantially along the respective broken lines 4—4, 5—5 in Fig. 1, with parts broken away;

Fig. 6 is a sectional detail of parts illustrated in Fig. 5;

Figure 1:
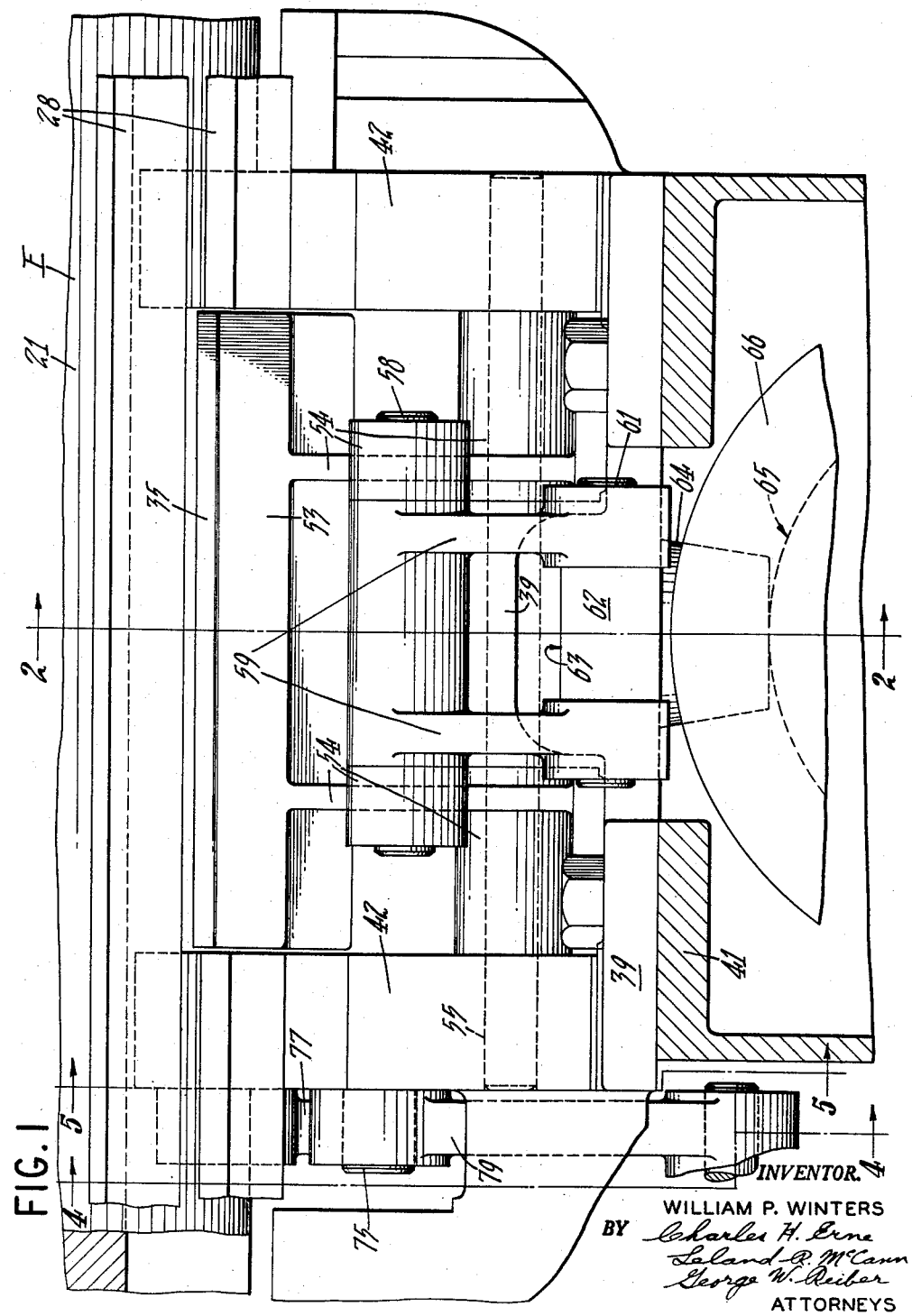
Figure 1 is a side elevation of the edger station of a can body making machine including a hook forming mechanism embodying the instant invention, with parts broken away.

As a preferred or exemplary embodiment of the instant invention the drawings illustrate principal parts of the edger station of a conventional can body making machine of the character disclosed in United States Patent 1,770,041 issued July 8, 1930, to John F. Peters on Roll Bodymaker. At the edger station the machine includes a mechanism for forming reversely bent hooks A, B (Fig. 2) on side seam marginal edge portions C, D of can body blanks or partially formed sheet metal can bodies E, preferably of cylindrical configuration. The reversely bent hooks A, B are subsequently utilized to unite the marginal edge portions of the can body, by an interengaging and bumping of the hooks together to produce a permanent lock side seam for the body.

In the can body making machine the partially formed can bodies E evolved from originally flat blanks are supported on a horizontally disposed cylindrical inner mandrel or horn 21 (Figs. 4 and 7) and are advanced along the horn intermittently through a plurality of working stations, including the edger station which embodies the present invention, for the various operations required to produce completed bodies. During a major portion of this advancement of a body E it partially surrounds the horn 21 with the side seam marginal edge portions C, D, disposed under the horn and spread apart in spaced relation as shown in Fig. 4; as yet nonhooked terminal edges F, G (Fig. 3) of the respective portions C, D riding in and being guided to locate the bodies on the horn, by grooves 22 (Fig. 4) formed in a pair of spaced and parallel longitudinal guide rails 23 secured to the horn. These guide rails 23 extend along the horn up to the edger station.

A partially formed can body E is advanced along the horn 21 by a series of stroke or feed bars 25 (Figs. 4 and 7) which are reciprocated in any suitable manner such as shown in the above mentioned Peters patent and which operate in longitudinal grooves 26 formed in the horn. The feed bars 25 carry conventional spring held feed fingers or dogs 27 (see also Figs. 2 and 5) which engage behind the can bodies on the horn to advance them intermittently from station to station including the edger station. Conventional hold down bars 28 carried in pivoted curved brackets 29 are disposed adjacent the horn 21 to hold the advancing bodies in place against the horn.

As a can body E is advanced by the feed dogs 27 into the edger station, the still straight terminal or marginal edges F, G of the side seam portions of the body ride out of the grooves 22 in the guide rails 23 and enter a recess 31 (Figs. 2 and 7) in the bottom of the horn where they are located in a predetermined position to determine the proper length of the finished hook and where the marginal edge portions C, D of the body are clamped in position to hold them for the hook forming operation. These operations are performed while the body is at rest at the edger station.

The clamping of the marginal edge portions C, D is effected after their respective straight terminal edges F, G have been properly located and is brought about by stationary clamp bars 34 (Fig. 2) and movable clamp bars 35. There are two stationary clamp bars 34, extending longitudinally of the horn 21 for a distance slightly longer than the can body E and located in the horn recess 31, one adjacent the path of travel of each marginal edge portion C, D of the body. These stationary clamp bars 34 are secured at their ends to a pair of spaced and parallel upright brackets 38 (Figs. 2, 5, 6, 8, 9 and 10) which extend up into the horn recess 31. The brackets 38 are secured to a base plate 39 which is mounted on a casing 41 (Figs. 1, 2 and 7) which constitutes a portion of the main frame of the can body making machine. Adjacent the brackets 38 the base plate 39 carries upright stop members 42 for locating the curved brackets 29 which support the hold down bars 28.

Outer faces 44 (Fig. 2) of the stationary clamp bars 34 are curved (convex) to correspond to the curvature of the outer face of the horn 21 and are aligned with the face of the horn to provide continuations thereof in the recess 31. One of the clamp bars 34 (at the left as viewed in Figs. 2, 5 and 7) along an innermost edge 45 (Fig. 2) is provided with an acute angle, hook forming face 46 which slopes inwardly from the outer curved face 44 of the bar to its inner edge 45.

The movable clamp bars 35 are disposed adjacent and extend along the stationary clamp bars 34 for their entire length between the brackets 38 and are formed with curved (concave) faces 48 (Figs. 2 and 3) which correspond to the conversely curved faces 44 of the stationary clamp bars 34 and are normally in spaced relation thereto as shown in Fig. 3, to permit the marginal edge portions C, D of the body to freely move into place between the clamp bars 34, 35 when the body is advanced into the edging station. The concave curved face 48 of the movable clamp bar 35 at the left as viewed in Fig. 2 is slightly shorter than the corresponding convex face 44 of the stationary clamp bar 34 so as to terminate just short of and clear of the apex of the acute angle face 46 of the adjacent stationary clamp bar 34 when the movable bar 35 closes against it.

The opposite movable clamp bar 35 (at the right in Figs. 2 and 3) is formed along an innermost edge 49 with an acute angle hook forming face 51 which slopes outwardly from the outer curved face 48 of the bar to its inner edge 49. The curved face 48 of this clamp bar 35, at the apex with the acute angle face 51 projects slightly beyond or inwardly of the curved face 44 of the adjacent stationary clamp bar 34, when the bars 34, 35 are closed, to provide clearance at the apex for the formation of a body hook B around it as will be hereinafter explained. In effect the combination of each pair of bars 34, 35 can be described as being an anvil means for guiding the formation of the required complementary side seam hooks.

Movement of the movable clamp bars 35 into clamping position against the stationary clamp bars 34 with the can body E interposed therebetween, preferably is effected by cam action. For this purpose the movable clamp bars 35 are secured to a pair of spaced and parallel movable support members 53 (Figs. 1, 2 and 9) which extend along the clamp bars between the brackets 38 outside of the horn 21. These members 53 are formed on pairs of toggle arms 54 having inner ends mounted on horizontally disposed pivot pins 55 extending parallel with the horn 21 and carried in end bearings formed in the upright brackets 38 and in an intermediate bearing 56 (Fig. 8) formed in the base plate 39 (see Figs. 1, 2, 5, 6, 8, 9 and 10).

The outer ends of the toggle arms 54 are connected by pivot pins 58 (Figs. 1, 2 and 9) to the upper ends of a pair of upright toggle links 59. The lower ends of the toggle links 59 are connected by pivot pins 61 to a horizontal slide 62 (see also Fig. 7) disposed transversely in relation to the horn 21. This slide 62 operates in a slideway 63 (Figs. 2, 8 and 10) formed in the base plate 39. The slide 62 is reciprocated in the slideway 63 through a clamping stroke (toward the left as viewed in Fig. 7) and thence through a return or unclamping stroke (toward the right in Fig. 7), by a cam roller 64 (Fig. 7) which operates in a cam groove 65 of a continuously rotating barrel cam 66. The cam 66 is mounted on a continuously rotating shaft 67 which is journaled in bearings 68 formed in the casing 41. The shaft 67 is rotated in any suitable manner such as shown in the above mentioned Peters patent, in time with the advancement of the can bodies E along the horn 21.

Figure 7:
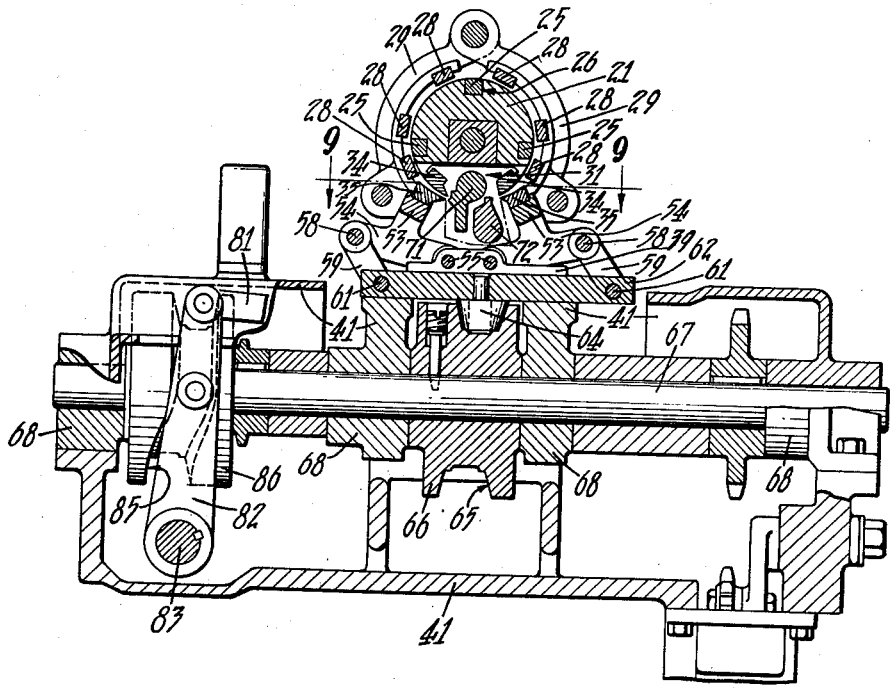
Fig. 7 is a reduced scale transverse sectional view of a conventional can body making machine edger station including the hook forming mechanism of the instant invention, with parts broken away.
Figure 8:
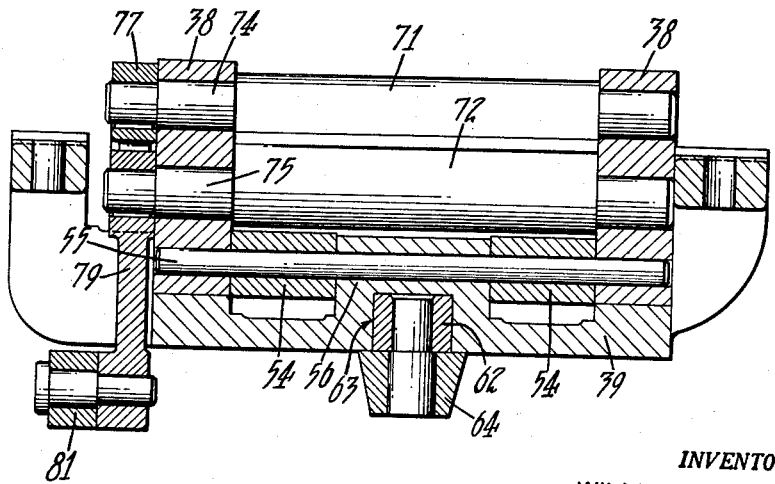
Fig. 8 is a reduced scale sectional view taken substantially along the broken line 8—8 in Fig. 2, with parts omitted.
Figure 9:
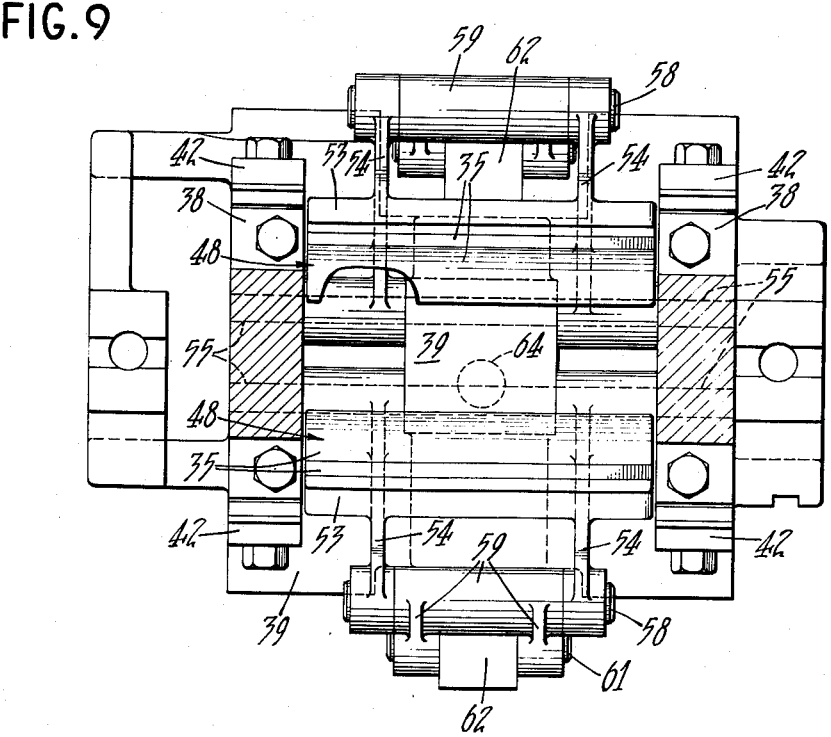
Fig. 9 is an enlarged top plan-sectional view taken substantially along the broken line 9—9 in Fig. 7, with parts broken away; the view being rotated 90°.
Figure 10:
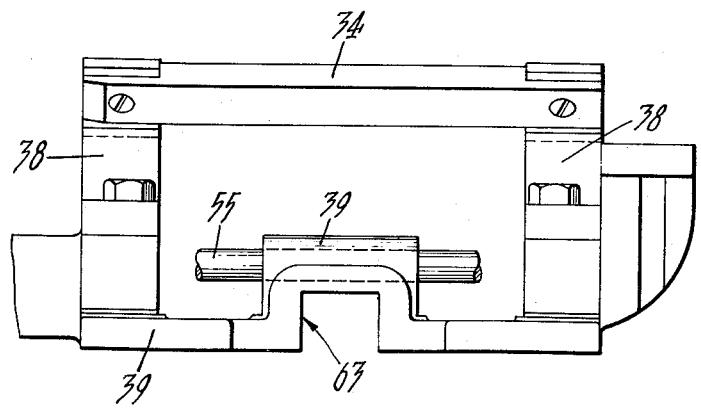
Fig. 10 is a side elevation of the parts shown in Fig. 6.

As the slide 62 moves toward the left as viewed in Fig. 7 it raises the toggle links 59 and thus rocks the toggle arms 54 upwardly to press the movable clamp bars 35 into clamping position against the stationary clamp bars 34 with the marginal edge portions C, D of the body E interposed between them as shown in Fig. 2. In this position of the clamp bars 34, 35 the prelocated straight terminal edges F, G of the clamped marginal edge portions C, D of the body extend freely out into the horn recess 31, a predetermined distance controlled by the prelocation of the edges, to be now explained, in readiness for the hook forming operation.

The prelocation of the terminal edges F, G of the marginal edge portions C, D and the forming of the hooks is effected by a pair of oscillatable tools 71, 72 (Figs. 2, 3 and 7) which are of a length slightly greater than the length of the body E and which are disposed parallel with and adjacent the clamp bars 34, 35. These tools are located between the upright brackets 38 and partially within the horn recess 31, between the spread-apart terminal edges of the marginal edge portions C, D. The tools are mounted on a pair of rocker shafts 74, 75 disposed at different elevations and carried in the upright brackets 38 (see also Fig. 8), one of the shafts 74 being disposed within said horn 21 in its recess 31 and the other of the shafts 75 being disposed outside of said horn.

The rocker shafts 74, 75 are oscillated in unison and in the same direction through a hook forming stroke and thence through an idle return stroke, followed by a dwell, in time with the advancement of the can body E into the edging station. For this purpose the upper rocker shaft 74 carries a rocker arm 77 (Figs. 4 and 8) which is connected by a link 78 to a bell crank 79 carried on the lower rocker shaft 75. The bell crank 79 is also connected by a link 81 to the upper end of an upright cam lever 82 keyed to a pivot shaft 83 journaled in suitable bearings formed in the casing 41. Intermediate its ends, the cam lever 82 carries a cam roller 84 which operates in a cam groove 85 formed in a barrel cam 86 mounted on and rotating with the shaft 67 in the casing 41.

Each of the tools 71, 72 is formed with a projection 88 (Figs. 2 and 3) having a radial hook bending face 89 which at its outer extremity terminates in a curved hook wiping or ironing face 91 which is concentric with the axes of the rocker shafts 74, 75 respectively and which is in tangential alignment with the acute angle faces 46, 51 of the stationary and the movable clamp bars 34, 35 respectively. The inner ends of the radial faces 89 terminate adjacent flat locating faces 92 disposed preferably at an obtuse angle to the base of the radial faces 89.

The normal positions of the tools 71, 72 when a partially formed can body E advances into the edging station, is shown in Fig. 3. In this position of the tools, the free terminal edges F, G of the edge portions C, D previously guided by the grooves 22 (Fig. 4) in the guide rails 23, move longitudinally into the horn recess 31 and ride onto the locating faces 92 at the base or inner ends of the radial faces 89 of the tools and thus locate the body on the horn peripherally. The radial faces 89 are of a predetermined length so as to locate the terminal edges F, G of the body relative to the acute angle faces 46, 51 of the stationary clamp bar 34 and the movable clamp bar 35 respectively. This predetermined length of the radial faces 89 determines the length of the hook accurately.

The locating of the terminal edges F, G of the edge portions C, D is effected while the body is advancing into the edging station. As soon as the body is at rest at this station, the movable clamp bars 35 move into clamping position against the stationary clamp bars 34 as shown in Fig. 2 with the marginal edge portions C, D interposed therebetween to clamp these portions tightly in position with the yet nonhooked terminal edges F, G extending free beyond the inner edges of the clamping bars (Fig. 3).

The clamping of the marginal edge portions C, D is immediately followed by a rocking of the tools 71, 72 in a clockwise direction as viewed in Fig. 2. During this rocking action, the radial faces 89 of the projections 88 on the tools 71, 72, wipe the freely extending terminal edge portions F, G of the body against the apex of the acute angle face 46 and the apex of the acute angle face 51 of the stationary and the movable clamp bars 34, 35 respectively, while the curved hook wiping faces 91 on the tools follow through to iron the bent terminal edges down against the acute angle faces 46, 51 thereof, thereby completing the formation of the hooks A, B simultaneously and in a single sweep or pass of the tools in one direction. The hook A is bent inwardly against the acute angle face 46 of fixed clamp bar 34, while the hook B is bent outwardly against the acute angle face 51 of the oppositely disposed movable clamp bar 35, to provide the desired reversed relation of the hooks.

Following this hook forming operation the tools 71, 72 rock back through their return oscillation to their original position as shown in Fig. 3. The body having the opposed complementary hooks A, B thereon is then advanced out of the edging station and a new body E is advanced thereinto for a repeat operation of the hook forming mechanism. This completes the cycle of operation of the mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. Mechanism for forming hooks on marginal side seam portions of a partially formed tubular sheet metal can body, comprising an internal mandrel support for said body, relatively movable anvil means for clamping said body on said support in predetermined spaced relation to the projecting edges of said marginal portions to leave said marginal portions projecting in unclamped relation beyond said anvil means, and a rotatable oscillatable tool operative in conjunction with said anvil means to form in a single unidirectional rotative sweep, a hook on one of said marginal portions, said tool having a forward hook bending face projecting radially from the tool axis and terminating in a rearward hook ironing face arcuately curved about said tool axis, said faces respectively successively forming and ironing out said hooks during said single unidirectional rotative sweep of said tool.

2. Mechanism for forming complementary hooks on the side seam marginal portions of a partially formed tubular sheet metal can body, comprising a mandrel support for said body, relatively movable anvil means for clamping said body in predetermined spaced relation to the projecting edges of said marginal edge portions to leave said edges projecting in unclamped relation beyond said anvil means, and a pair of connected rotatably oscillatable tools having means for conjointly moving the same and operative in conjunction with said anvil means to form in a single unidirectional rotative sweep opposed complementary hooks on said marginal edge portions, each of said tools having a hook bending face projecting radially from the tool axis and terminating in a rearward hook ironing face arcuately curved about said tool axis, said faces respectively successively forming and ironing out said hooks during said single unidirectional rotative sweep of said tools.

References Cited in the file of this patent

UNITED STATES PATENTS

| 1,625,091 | Peters | Apr. 19, 1927 |
| 1,764,318 | Kruse | June 17, 1930 |
| 1,770,041 | Peters | July 8, 1930 |
| 1,801,504 | Hothersall | Apr. 21, 1931 |
| 2,337,901 | Krueger | Dec. 28, 1943 |
| 2,430,010 | Geertsen | Nov. 4, 1947 |
| 2,455,938 | Martin | Dec. 14, 1948 |